June 16, 1925. Re. 16,099
S. D. SPRONG
APPARATUS FOR ADDING TO THE OUTPUT OF A MAIN POWER STATION, THE OUTPUT OF ONE OR MORE DISTANT SOURCES
Original Filed April 12, 1918
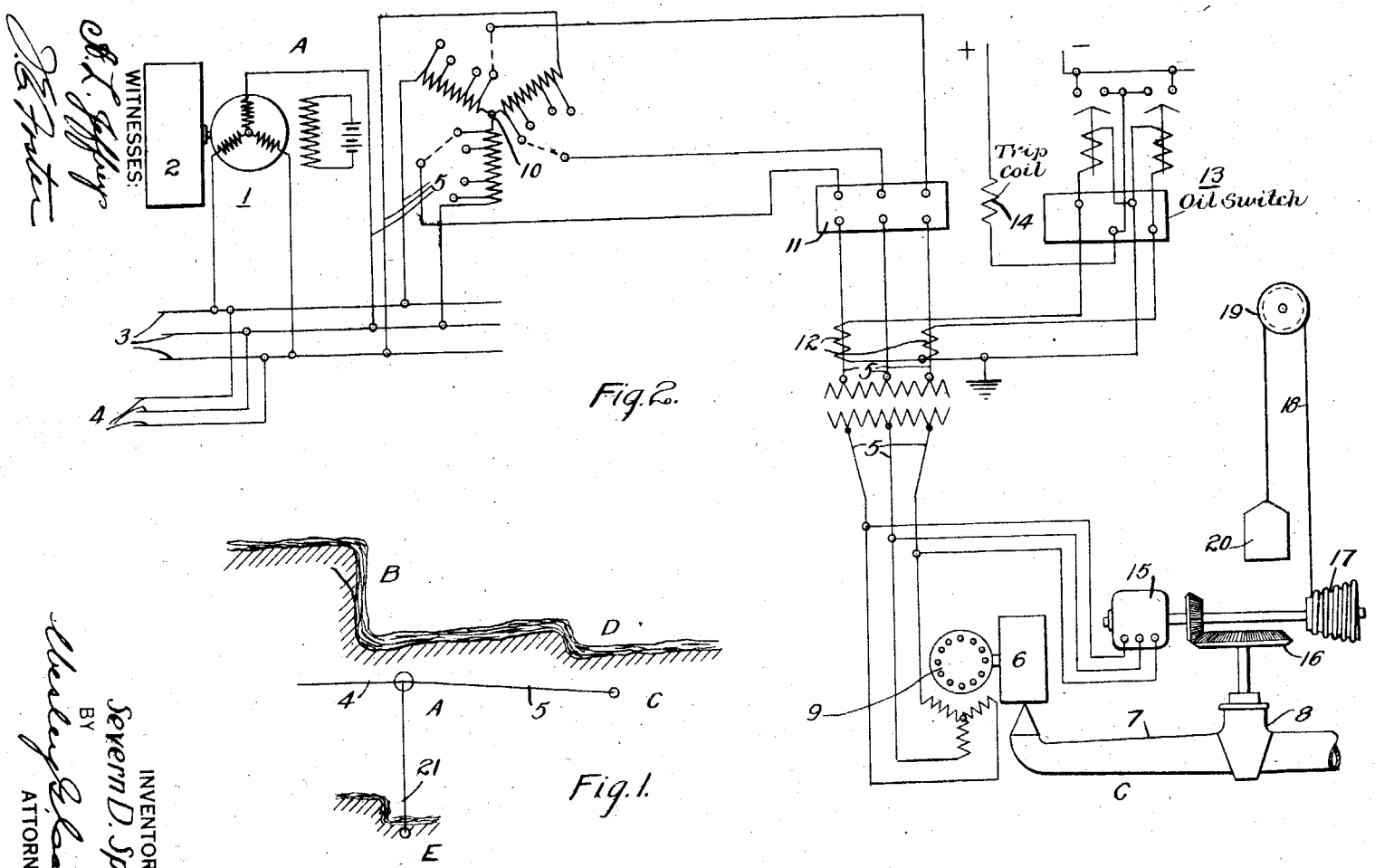
WITNESSES:
A. L. Jeffreys
J. E. Foster
INVENTOR
Severn D. Sprong
BY
Wesley G. Carr
ATTORNEY Reissued June 16, 1925. Re. 16,099

UNITED STATES PATENT OFFICE.

SEVERN D. SPRONG, OF BROOKLYN, NEW YORK, ASSIGNOR TO WESTINGHOUSE ELECTRIC & MANUFACTURING COMPANY, A CORPORATION OF PENNSYLVANIA.

APPARATUS FOR ADDING TO THE OUTPUT OF A MAIN POWER STATION THE OUTPUT OF ONE OR MORE DISTANT SOURCES.

Original No. 1,329,276, dated January 27, 1920, Serial No. 228,078, filed April 12, 1918. Application for reissue filed September 14, 1921. Serial No. 500,670.

*To all whom it may concern:*

Be it known that I, SEVERN D. SPRONG, a citizen of the United States, residing at Brooklyn, in the county of Kings and State of New York, have invented a new and useful Improvement in Apparatus for Adding to the Output of a Main Power Station the Output of One or More Distant Sources, of which the following is a specification.

It frequently happens that while in a certain territory there may be several separated sources of water power, a combination of all of them, or even of some number less than all, is impracticable because the expense is found not justified by the gain in power. Hence some one source of power is usually selected, and the single generating plant is located in its immediate proximity. Such a condition arises, for example, on a river or stream where there is a succession of falls; some one falls, where the greatest head is available, being chosen.

It is, however, generally recognized that if auxiliary generating plants of relatively low cost both of installation and operation could be established at one or more of the secondary power sites, the general gain will justify the enterprise, and especially if the auxiliary installation can be controlled directly from the main power station.

This is the problem which is now solved by my present invention.

In the accompanying drawing;

Figure 1 is an illustrative diagram, showing the location of the main and the distant auxiliary stations.

Fig. 2 is an electrical diagram, showing the apparatus and circuits of the system.

For purpose of illustration, I will assume that the main station A is located at the high falls B of a river and there receives power, and that the auxiliary station C is located at and receives power from the low falls D, distant from falls B.

At the station A is a three-phase synchronous generator 1, actuated by a water-wheel, indicated at 2. Generator 1 delivers to the bus 3, to which is connected the main transmission line 4 and the auxiliary line 5 communicating with station C.

At station C is a water-wheel, indicated at 6, which is driven by the water coming through pipe 7, in which pipe is a rotary gate-valve 8. Water-wheel 6 drives a three-phase induction generator 9, here of the squirrel cage type.

In the auxiliary line 5 is connected a manually controllable three-phase auto-transformer 10, an oil switch 11, and current transformers 12, said current transformers being connected to the coils of a relay 13. The trip coil 14 of the oil switch is connected to a source of direct current supply and to the fixed terminals of relay 13.

The gate-valve 8 at station C is controlled by an electric motor 15 connected to line 5. On the shaft of said motor is a bevel pinion engaging gear 16 on the stem of valve 8. Also on said motorshaft is a stepped cone pulley 17, on which is wound the cord 18 which, after passing over fixed pulley 19, carries a counter-weight 20.

The operation is as follows:

The operator at the main station A sets the auto-transformer 10 at minimum voltage, as shown in Fig. 2. He also manually closes oil switch 11. The induction generator 9 at station C then having voltage applied to it, begins to rotate as a motor. The motor 15 at station C receiving low voltage makes turns until its torque is counterbalanced by weight 20. Valve 8 is thus partially opened, allowing a small amount of water to pass to water-wheel 6.

The operator then sets auto-transformer 10 to impress higher voltages successively on transmission line 5 until full normal voltage is reached. Induction generator 9 is thus gradually brought up to speed as an induction motor, and motor 15 gradually rotates valve 8 to full open position, thus permitting full water supply to pass to wheel 6, which in turn drives induction generator 9 at a speed slightly above synchronism, thereby converting said generator from the condition of a motor to that of an auxiliary generator delivering energy to the main transmission line 4, and so supplementing the output of the generator 1 at the main station A, and thus utilizing the power of the falls at D.

Should an accident, such as a short c-cuit, occur on the line 5 between the stations, the oil switch 11 controlled by overload relay 13 immediately opens because of the excess current flowing into that circuit from the main generating station. No exciting current can then pass to induction generator 9 or motor 15, and the auxiliary station C becomes electrically dead. The counterweight 20 then rotates electric motor 15 in the reverse direction, which closes valve 8, so shutting off the water supply to wheel 6, and the whole apparatus at the auxiliary station C comes to rest without shock or damage.

In case the operator at the main station wishes to obtain from the auxiliary station less than its maximum output, he does not bring the connecting line to maximum voltage, but moves the switch lever of autotransformer 10 to some intermediate point and allows it there to remain. The effect is to diminish the torque of the motor 15, permitting it to remain in the intermediate position, with the gate valve 8 but partly opened, thus delivering part load to the water-wheel 6 and the generator 9. In normal operation when it is desired to shut down auxiliary station C, the oil switch 11 is manually opened.

The squirrel cage induction generator here shown as installed at the auxiliary station C requires no independent excitation, no voltage control, and no speed control. Nor does it have to be synchronized when connected to the line, nor is it fixed as to frequency. This is due to the fact that the generator is excited from "out of phase" current taken from the live line to which it is connected. The voltage and frequency of such live line determined the voltage and frequency of the induction generator, and it is only necessary in order to have the generator to act as a true generator and send out current at proper voltage and frequency that it be driven slightly above synchronism, as hereinbefore described. Such excess speed above synchronism is what may be called a "positive slip" and corresponds to the negative slip of the same machine when operating as an induction motor.

From all the foregoing it will be seen that I not only secure the whole or partial output of the auxiliary station C, but also control the apparatus at said station from the main station A, thus eliminating any manual control or personal supervision of said apparatus by attendants at the auxiliary installations.

I have herein shown in Fig. 1 a second auxiliary station E, connected by transmission line 21. Any number of such stations, distant from main station A and from one another, may be independently connected by their own transmission lines to bus 3, so that all of said auxiliary stations, if desired, or a selected number of them, may be caused to contribute their output to that of the main station.

It is also observed that the transmission of power and of control between the main power station and the auxiliary power station is accomplished over a single auxiliary—here polyphase—transmission line; and that if a plurality of auxiliary stations, distant from the main station and from one another, be present, then the transmission of power and of control takes place between the main power station and all or any number of the auxiliary stations through the single lines connecting said main station with said auxiliary stations.

I claim as my invention:

1. A main generating plant, an auxiliary generating plant distant from said main plant, a single transmission line connecting said plants, means connected in and operating through said transmission line for causing said auxiliary plant to add its output through said transmission line to the output of said main plant and means at said main generating plant for controlling said operating means.

2. A main generating plant, a plurality of auxiliary generating plants distant from said main plant and from one another, single transmission lines connecting each of said auxiliary plants with said main plant, means connected in and operating through each of said transmission lines for causing all or any number of said distant plants to add their outputs to the output of said main station through said transmission lines and means at said main generating plant for controlling said operating means.

3. The method of controlling from a main generating plant at a given power station, an auxiliary generating plant at a distant power station electrically connected to said main station, and of causing said auxiliary plant to add its output to the output of said main station, which consists in first actuating the generator at said distant station as a motor by low voltage transmitted from said main station while independently driving said generator by power at said distant station, then increasing said voltage and said driving power until said distant station generator operates as a true generator and delivers energy to said main station.

4. A synchronous polyphase generator, a main transmission line supplied thereby, an auxiliary transmission line in branch from said main line, a polyphase induction generator connected to said auxiliary transmission line, and at a distant power station, means actuated by the power at said station for driving said induction generator, an electric motor connected in branch to said auxiliary transmission line, and means controlled by said electric motor for regulating the power actuating said driving means.

5. A synchronous polyphase generator, a main transmission line supplied thereby, an auxiliary transmission line in branch from said main line, means for regulating the voltage on said auxiliary transmission line, and at a distant power station, a polyphase induction generator connected to said auxiliary transmission line, means actuated by the power at said station for driving said induction generator, an electric motor connected in branch to said auxiliary transmission line, and means controlled by said electric motor for regulating the power actuating said driving means.

6. A synchronous polyphase generator, a main transmission line supplied thereby, an auxiliary transmission line in branch from said main line, means for regulating the voltage on said auxiliary transmission line, a manually operable switch in said auxiliary transmission line, and means automatically operating to open said switch upon the occurrence of an accident—such as a short circuit—on the auxiliary transmission line, and at a distant power station, a polyphase induction generator connected to said auxiliary transmission line, means actuated by the power at said station for driving said induction generator, an electric motor connected in branch to said auxiliary transmission line, and means controlled by said electric motor for regulating the power actuating said driving means.

7. A synchronous polyphase generator, a main transmission line supplied thereby, an auxiliary transmission line in branch from said main line, means for regulating the voltage on said auxiliary line, and at a distant power station, a polyphase induction generator connected to said auxiliary transmission line, means actuated by the power at said station for driving said induction generator, an electric motor connected in branch to said auxiliary transmission line, means controlled by said motor for regulating the power actuating said driving means, and means for progressively counter-balancing the torque of said motor.

8. A synchronous polyphase generator, a main transmission line supplied thereby, an auxiliary transmission line in branch from said main line, means for regulating the voltage on said auxiliary line, and at a distant station, a polyphase induction generator connected to said auxiliary transmission line, a hydraulic motor driving said generator, a duct delivering actuating fluid to said motor, a valve in said duct, an electric motor connected in branch to said auxiliary transmission line and controlling said valve to regulate the fluid supply to said hydraulic motor, and means for progressively counter-balancing the torque of said motor.

9. The combination of claim 8, including as the means for regulating the voltage on the auxiliary transmission line, a manually controllable auto-transformer in said line.

10. A synchronous polyphase generator, a main transmission line supplied thereby, an auxiliary transmission line in branch from said main line, means for regulating the voltage on said auxiliary line, and at a distant station, a polyphase induction generator connected to said auxiliary transmission line, a hydraulic motor driving said generator, a duct delivering actuating fluid to said motor, a rotary valve in said duct, an electric motor connected in branch to said auxiliary transmission line and having its shaft geared to said valve, a stepped cone pulley on said motor shaft, a cord on said cone pulley, and a counter-weight suspended by said cord.

11. A main generating plant, an auxiliary generating plant distant from said main plant, a transmission line connecting said plants, means connected in and operating through said transmission line for causing said auxiliary plant to add its output through said transmission line to the output of said main plant, and a manually operable device at said main generating plant for controlling said operating means.

12. The combination with an alternating current system and a source of energy therefor, of an auxiliary generator, a fluid-actuated means for driving the generator, a source of fluid energy for actuating the driving means, energy-storage means for controlling the flow of the fluid to the fluid-actuated means, and means for controlling the energy-storage means through the main power conductors of the alternating-current system.

13. The combination with an alternating current system and a source of energy therefor, of an auxiliary generator, fluid-actuated means for driving the generator, a valve for controlling the rate of fluid supply to the fluid-actuated driving means, means energized from the main system for controlling the position of the valve, and means for impressing upon the system an electromotive force for operating said valve-controlling means.

14. The combination with an alternating current system and a source of energy therefor, of an auxiliary generator, fluid-actuated means for driving the generator, a valve for controlling the amount of fluid to the fluid-actuated driving means, reversible means for controlling the position of the valve, and means, operating through the main power conductors of said system, for controlling said reversible means.

15. In a power distributing system, the combination with a main source of energy, of an auxiliary generator, a water-wheel therefor and a source of water power for actuating said wheel, a gate-valve for controlling the supply of water to said wheel, a motor normally rotating in one direction for opeaing the valve, means for effecting a reverse rotation of the motor to control the adjustment of the valve to control the power that shall be delivered to the system by the auxiliary generator, and means operating through the main power conductors of said system for controlling the motor.

16. In a power distributing system, the combination with a main source of energy, of an auxiliary generator, a water-wheel therefor, a gate-valve for controlling the flow of water to the water-wheel, a motor for the valve, means whereby the valve may be controlled in accordance with the energization of the motor, and means for energizing the motor through the main power conductor of the distributing system.

17. In a power distributing system, the combination with a main source of energy, of an auxiliary generator, a water-wheel therefor, a gate-valve for controlling the flow of water to the water-wheel, a motor for controlling the position of the gate-valve, means controlled in accordance with the direction of rotation of the motor for controlling the operation of the valve, and means, operative through the main power conductors of the distributing system, for controlling the operation of the motor.

18. In a power distributing system, the combination with a main source of energy, of an auxiliary generator, a water-wheel therefor, a gate-valve for controlling the flow of water to the water-wheel, a polyphase motor energized from the distribution system for controlling the position of the gate-valve, means for controlling the direction of rotation of the motor, and means operative through the main power conductors of said system for controlling the motor.

19. In a power distributing system, the combination with a main source of energy, of an auxiliary generator, a water-wheel therefor, a gate-valve for controlling the flow of water to the water-wheel, a polyphase motor energized from the distribution system for controlling the position of the gate-valve, means for closing the gate-valve when energy is no longer to be supplied to the distribution system by the auxiliary generator, and means operative through the main power conductors of said system for controlling the operation of the motor to control the operation of said valve-closing means.

20. In a power distributing system, the combination with a main source of energy, of an auxiliary generator, a water-wheel therefor, means associated with the water-wheel comprising an energy-storage reservoir, a gate-valve for controlling the flow of water to the water-wheel, a motor for controlling the position of the gate-valve, means, operative through the main power conductors of said system, for controlling the motor, and means responsive to the condition of the energy-storage reservoir for closing the gate-valve when energy is no longer to be supplied to the distribution system by the auxiliary generator.

21. In a power distributing system, the combination with a main source of energy, of an auxiliary generator, a water-wheel therefor and a source of water power for actuating said wheel, a gate-valve for controlling the supply of water to said wheel, a motor energized from the distribution system for controlling the operation of the gate-valve, and means for causing the motor to rotate in a direction opposite to that in which its energization from the distribution system is tending to cause it to rotate.

22. In a power distributing system, the combination with a main synchronous generator supplying energy to the system and an auxiliary generator actuated by water-actuated means, of means for regulating the supply of water to said water-actuated means, a motor energized from the system for controlling said regulating means, and means, operating through the main power conductors of the system, to control the motor.

23. In a power distributing system, the combination with a main synchronous generator supplying energy to the system and an auxiliary generator actuated by water-actuated means, of means whereby the auxiliary generator may be simultaneously energized from the distributing system and operated as a generator by the water-actuated means, and regulating means whereby the auxiliary generator is controlled to assume a portion of the load on the system.

24. In combination, a main generating station, an auxiliary generating station, a transmission line adapted to be energized from both stations and means disposed at the main station for controlling the auxiliary station to supply energy to the transmission line only while the transmission line is energized.

25. The method of connecting an alternating-current generator driven by a fluid-operated prime mover to an energized power circuit, which comprises applying an electrical potential from the energized power circuit to the generator to start the generator from rest and simultaneously causing the fluid-operated prime mover to be supplied with operating fluid, and then simultaneously increasing the electrical potential applied to the generator and the amount of fluid supplied to the prime mover.

26. The method of connecting a generator to a transmission line which comprises starting the generator from rest and accelerating it to substantially synchronous speed by imparting to the generator both mechanical energy through a prime mover for the generator and electrical energy of approximately normal frequency from the line.

27. The method of connecting an alternating-current generator driven by a fluid-operated prime mover to an energized power circuit, which comprises simultaneously increasing the electrical potential applied to the generator from the energized power circuit and the amount of fluid supplied to the fluid-operated prime mover, from zero to substantially the normal operating values.

28. In a power system, the combination with a main generating station, a second generating station and a transmission line therebetween, of means associated with the second generating station for controlling the supply of energy by the second station to the system and step-by-step means operative through said transmission line for controlling the energy-controlling means.

29. In an electrical system of distribution, the combination with a main generating station, a plurality of auxiliary generating stations provided with energy-translating apparatus, and a common power-transmission circuit to which the respective stations are to supply energy, of means for connecting the apparatus of the respective stations to the power-transmission circuit, means for impressing upon a portion of the transmission circuit an electromotive force having characteristics differing from the characteristics of the normal operating potential of the power circuit and means associated with the respective translating apparatus and responsive to the impressed electromotive force for selectively controlling the translation of energy from the associated apparatus to the power circuit.

In testimony whereof, I have hereunto subscribed my name this 7th day of September, 1921.

SEVERN D. SPRONG.